Aug. 10, 1965    R. D. CHAPIN    3,199,791
WATER DISTRIBUTING SYSTEM
Filed Oct. 30, 1963    3 Sheets-Sheet 1

Richard D. Chapin
INVENTOR.

BY
Attorneys

Aug. 10, 1965    R. D. CHAPIN    3,199,791
WATER DISTRIBUTING SYSTEM
Filed Oct. 30, 1963    3 Sheets-Sheet 2
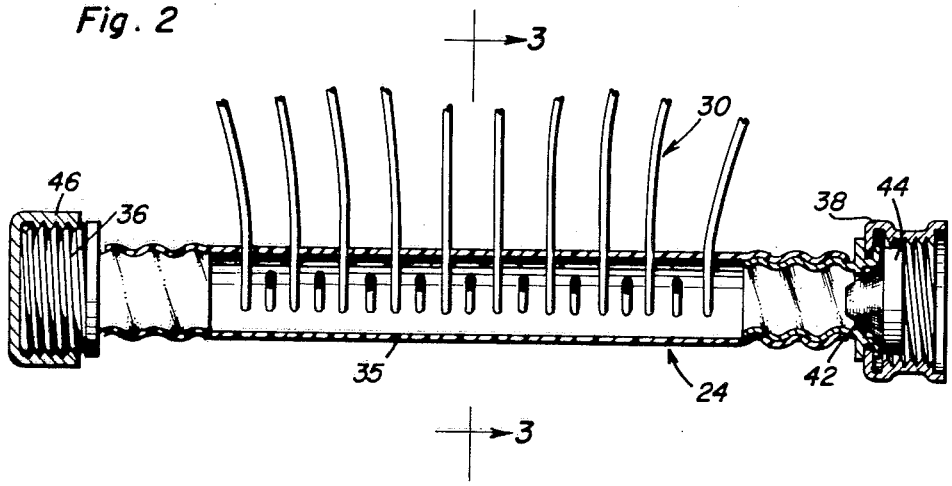
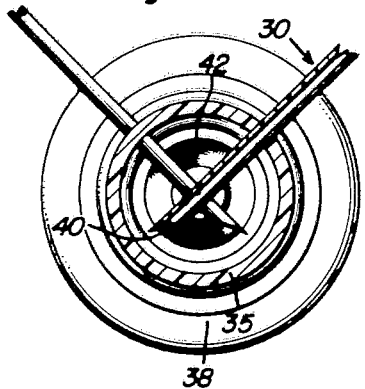
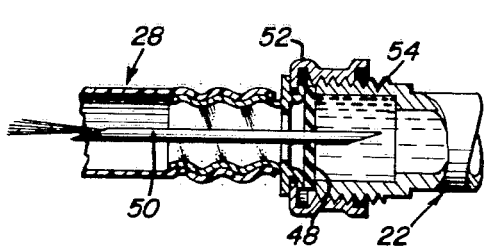
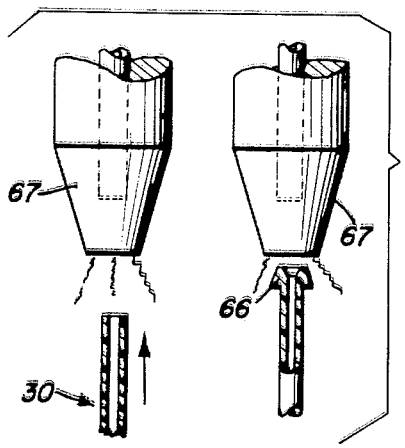
Richard D. Chapin
INVENTOR.

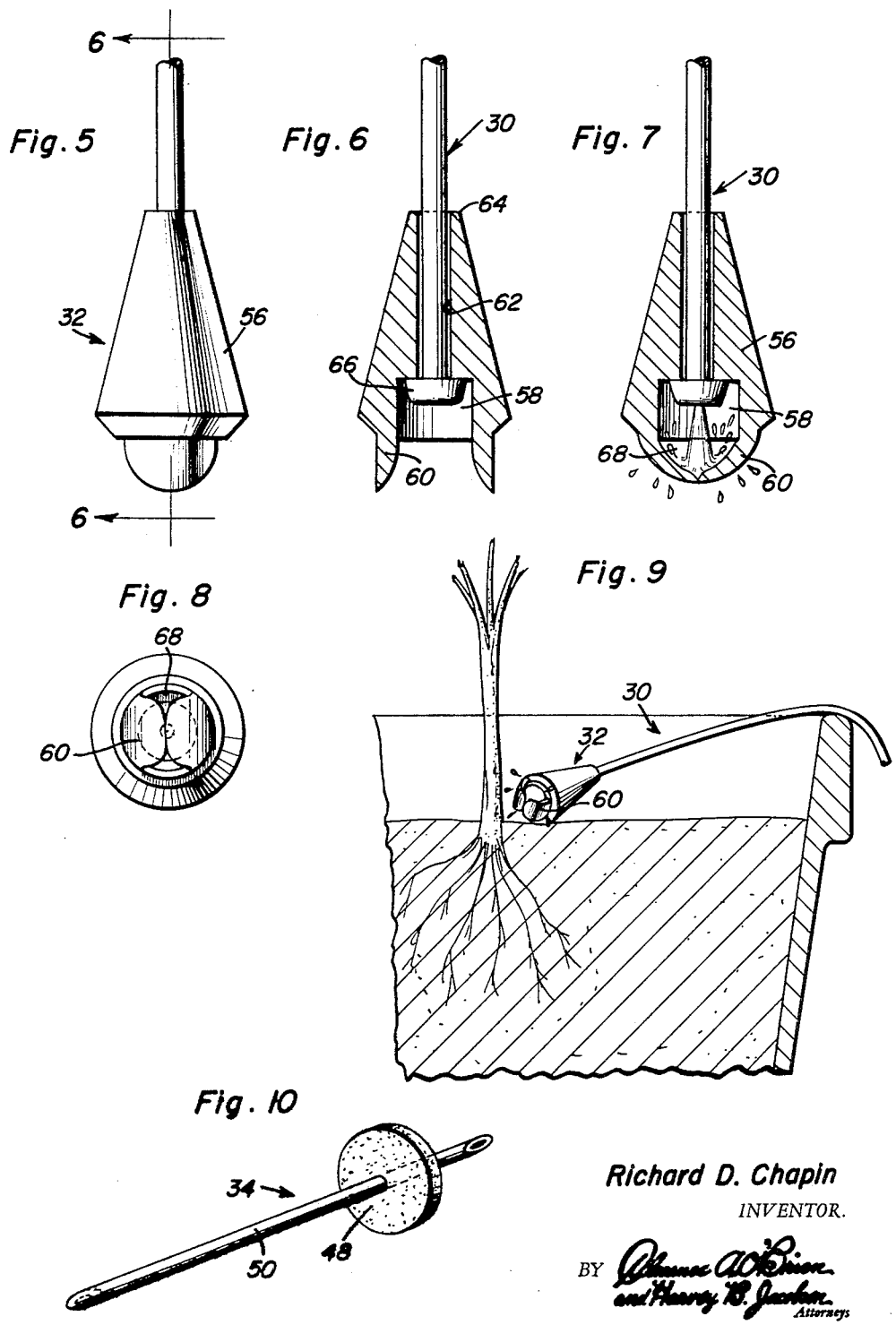

United States Patent Office 3,199,791
Patented Aug. 10, 1965

3,199,791
WATER DISTRIBUTING SYSTEM
Richard D. Chapin, 368 N. Colorado Ave.,
Watertown, N.Y.
Filed Oct. 30, 1963, Ser. No. 320,018
10 Claims. (Cl. 239—542)

The present invention relates to new and useful improvements in water distributing systems, it being a primary object of the invention to provide a water distributing system which is capable of efficiently watering large numbers of plants simultaneously.

Another object of the invention is to provide a plurality of individually significant features cooperatively associated so as to produce a substantially improved water distributing system.

In conjunction with the above object, it is an object of the instant invention to provide a tube weight capable of not only maintaining the outlet end of a leader tube in communication with a potted plant, but also acting as a means for deflecting the flow of water from the leader tube so as not to disturb the plant soil.

Further, it is an object of the instant invention to provide a tube weight or holder which is quickly and easily mounted on the tube.

Likewise, it is an object of the invention to provide a novel means for forming the ends of the leader tubes for retaining the weights.

Also, an important object of the instant invention resides in the provision of a tube weight or holder which, while maintaining the tube end in position against accidental dislocation such as might result from the pressure of the water flowing therethrough, in no way interferes with the removal of the potted plant, the weight merely dropping away from the plant as the plant is removed.

Also, an object of the present invention is to provide a plurality of distributors or manifolds which communicate the individual leader tubes with the main water supply, any number of these manifolds being used in series.

Furthermore, an object of the present invention is to provide a means for effectively reducing the water pressure when only a limited number of distributors or manifolds are used.

In addition, it is a significant object of the instant invention to provide a water distributing system wherein the individual components are of a highly durable nature, of a convenient size and shape so as to be easily packaged for commercial distribution, and of a nature which allows the individual purchaser to quickly achieve the particular combination most suited to his specific purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an enlarged cross-sectional view taken substantially on the plane passing along line 2—2 in FIGURE 1 illustrating one of the water distributors or manifolds;

FIGURE 3 is an enlarged cross-sectional view taken substantially on a plane passing along line 3—3 of FIGURE 2;

FIGURE 4 is an enlarged cross-sectional view taken substantially on a plane passing along line 4—4 in FIGURE 1 illustrating the positioning of the water pressure reducer;

FIGURE 5 is an enlarged elevational view of one of the tube weights or holders prior to the bending of the tabs;

FIGURE 6 is a cross-sectional view taken substantially on a plane passing along line 6—6 in FIGURE 5;

FIGURE 7 is a cross-sectional view similar to FIGURE 6 with the tabs bent into their final position so as to retain the tube and cause a diffusion of the water;

FIGURE 8 is a bottom plan view of the tube weights;

FIGURE 9 is a view generally illustrating the use of the weight in maintaining a leader tube within a potted plant;

FIGURE 10 is an enlarged perspective view of the water pressure reducer; and

FIGURE 11 is a diagrammatic illustration of the manner in which the flanged ends on the leader tubes are formed.

Figure 1:
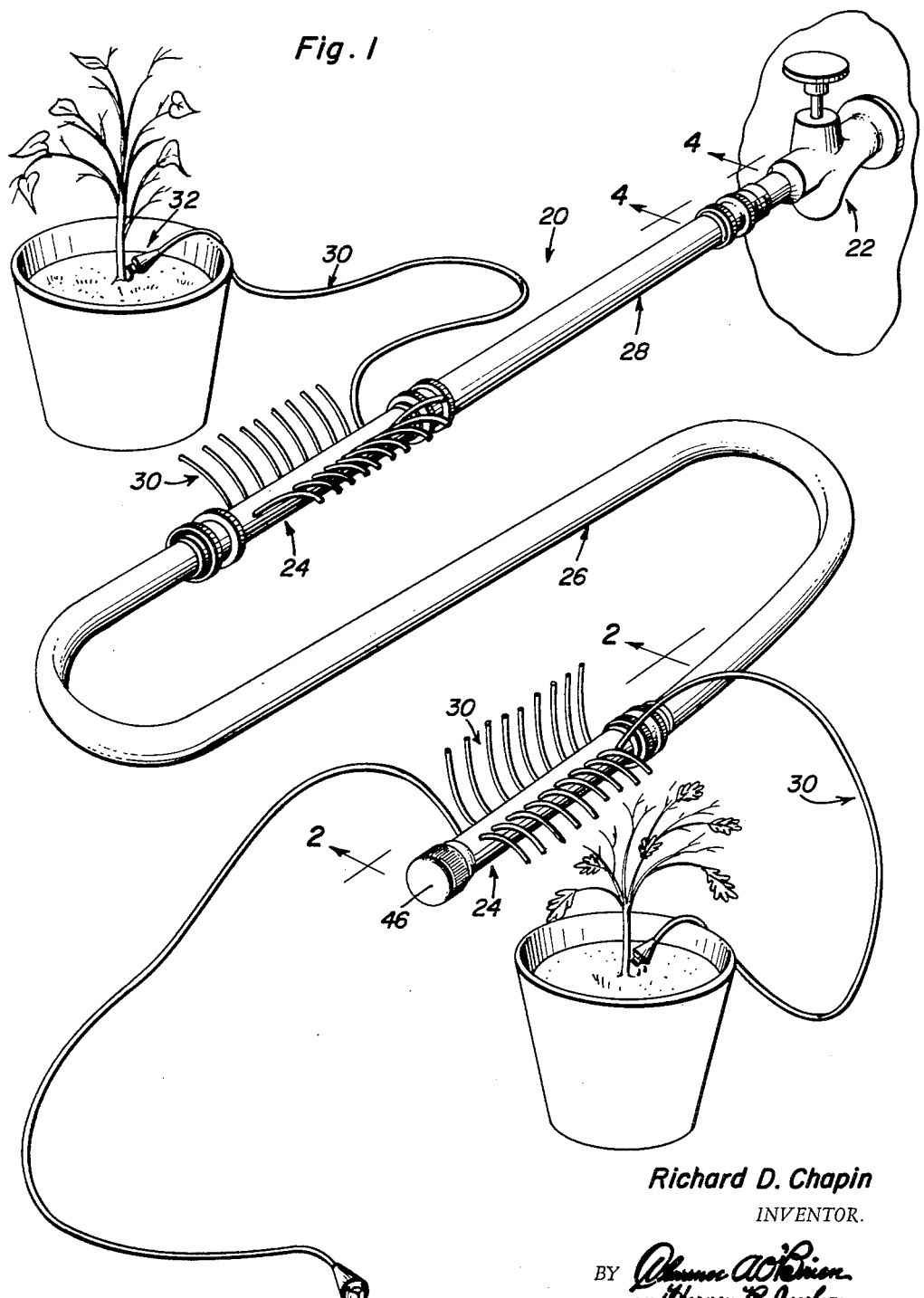
FIGURE 1 is a schematic perspective view illustrating generally the water distributing system comprising the instant invention.

Referring now more specifically to the drawings, reference numeral 20 is used to designate the system comprising the instant invention. This system 20, used in conjunction with a pressurized water supply represented by the faucet 22 in FIGURE 1, consists basically of one or more water distributors or manifolds 24 interconnected by connecting hoses 26 and communicated with the faucet 22 by a supply hose 28, a plurality of elongated leader tubes 30 each having one end communicated with a manifold 24 and the other end thereof provided with a tube weight or holder 32 for maintaining the tube end properly orientated within a potted plant, and a pressure reducer 34 provided within the supply hose 28 for limiting the amount of water flowing to the supply hose so as to prevent the build-up of excess pressure, this being necessary only when a relatively few distributors or manifolds 24 are used.

Turning first to the manifolds 24, it will be noted that each consists of an elongated body 35, preferably of plastic, having a male hose coupling 36 fixed within one end thereof and a female hose coupling 38 fixed within the other end thereof. The leader tubes 30, approximately twenty being provided in conjunction with each manifold 24, are frictionally engaged through preformed apertures within the body 35, the inner end of each leader tube 30 being beveled, as indicated by numeral 40, so as to facilitate their insertion into communication with the interior of the corresponding water distributor or manifold 24. The female hose coupling 38 of each manifold 24 is preferably provided with a screen-like structure 42 projecting inwardly from an integral resilient washer 44 thus effectively filtering out any foreign matter which might tend to clog the small flow passage of the leader tube 30, these flow passages being of generally capillary size. The manifolds 24 are arranged in series, as many manifolds being provided as deemed necessary for the partciular situation involved, with the first manifold 24 being communicated with the pressurized water supply through a first water supply hose 28 and with the remainder of the manifolds 24 being interconnected through elongated connecting hoses 26 which may vary in length as required. The last manifold has the remote end thereof sealed, this preferably being done by the provision of an end cap 46 threaded on the male hose coupling 36. Incidentally, by removing this cap 46, the manifold 24 and hoses 26 and 28 can be quickly flushed so as to remove any foreign particles which might have become lodged therein.

In the event that only a relatively few number of manifolds 24 are to be used, the use of the pressure reducer 34 is deemed advisable so as to prevent the build-up of excess pressure. This pressure reducer consists of a flat resilient disk or washer-like member 48 having an elongated tube 50, of substantially greater cross-sectional area than the tubes 30, extended centrally therethrough and frictionally retained in position. The disk 48 is positioned within the female hose coupling 52 on the end of the supply hose 28 and provides a seal, in the manner of a conventional washer, between the female hose coupling 52 and the male hose coupling 54 of the faucet 22, the enlarged tube 50 projecting both inwardly of the male hose coupling 54 and inwardly of the supply hose 28.

A tube holder or weight 32 is secured to the free end of each leader tube 30 and consists of a generally conical body 56 having an enlarged circular recess 58 extending centrally inward of the base or bottom thereof, a pair of downwardly or outwardly directed bendable tabs 60 located on opposite sides of the recess 58, and elongated passage 62, of a diameter substantially less than the diameter of the recess 58, extending inwardly from the apex end 64 and communicating with the recess 58 centrally thereof. The passage 62 is of a size so as to allow the introduction of the end of the leader tube 30 easily therethrough, the extreme end of the leader tube 30 located within the recess 58 having a radially outwardly projecting flange or enlargement 66 so as to prevent its withdrawal.

It is contemplated that these leader tubes 30 be of a thermoplastic material with the flange or enlargement 66 on each tube being formed by the approach of the end close to a heat source 67 of sufficient intensity so as to cause a flow, this flow occurring in a radial outward direction. As soon as the desired flange is formed, the end is removed from the heat source and allowed to harden.

While the provision of the flange 66 on the extreme end of the leader tube 30 is preferred, it should also be noted that the instant invention contemplates the provision of any type of projection on the tube 30 at or rearward of the extreme end and of a size so as to prevent withdrawal of this extreme end through the passage 62, this projection being located within the recess or chamber 58.

The final step in securing the weight 32 to the leader tube 30 is the bending of the tabs 60 into either actual engagement or substantial engagement with each other as indicated in FIGURES 7-9. It will be appreciated that the tabs 60 are of a length and width so as to provide a downwardly projecting arcuate chamber in conjunction with the recess 58, this chamber having the opposite sides thereof open, as indicated by reference numeral 68, whereby water flowing from the leader tube 30 is directed against the tabs 60 located diametrically opposite therefrom with the water subsequently flowing gently from each side of the weight through the openings 68. It will also be appreciated that in the event the tabs 60 do not actually contact each other, the distance therebetween should be so slight as to prevent any flow of water directly therethrough from the tube. Thus, it will be noted that the tabs not only assist in retaining the tube weight 32 in position on the end of the leader tube, but also acts as a baffle means so as to prevent the flow of water directly from the leader tube 30 into contact with the soil, this direct flow being capable of causing an undesirable eroding of the soil.

A particular desirable material for the tube weights 32 is lead, the inherent nature of the material allowing the tabs 60 to be both closed or bent into position and subsequently opened at least a few times, for obtaining access to the end of the leader tube as might be occasionally necessary to remove foreign matter. Further, it will be appreciated that both the size and shape of the individual weights 32 allow the leader tubes 30 to be quickly positioned in communication with the potted plants by merely dropping one weighted end into each pot, these weighted ends freely falling from the potted plants upon a removal of the potted plant thus causing no unnecessary delay such as might be present were the leader tube clipped directly to the pot or embedded in some manner directly within the soil.

From the foregoing, it should now be appreciated that a novel water distributing system has been defined incorporating various features which combine to insure an efficient and economical watering of a plurality of potted plants with a minimum of effort. In addition, it will be recognized that this watering of the plants is accomplished all at one time, regardless of the number of plants involved, with the individual leader tubes being positioned within each potted plant in a manner so as to cause no disruption of the soil therein and introduce the water in a gentle stream contemplated to soak directly into the soil without causing an erosion thereof. Further, in regard to the means for maintaining the leader tubes in contact with the individual potted plants, it will be appreciated that the conically shaped weights or holders are specifically designed so as to simply fall away from the potted plant upon a removal of the plant thus eliminating the necessity of specifically disengaging the leader tube before the moving of the plant.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in a water distributing system, an integral one-piece tube weight, said tube weight being generally conical in shape and including a small apex and an enlarged base, an enlarged centrally located recess extending inwardly from said base, a plurality of tabs depending from the base at spaced points about said recess, said tabs being bendable toward each other in a manner so as to span the central portion of the recess in spaced relation to portions of the periphery thereof, and an elongated passage extending inwardly through the apex into communication with the recess.

2. For use in a water distributing system, a flexible water tube for feeding water to a plant, and a tube weight, said tube weight including an interior chamber opening at opposite sides of the weight to the exterior, a passage from the exterior through a portion of the weight into lateral communication with the chamber, one end portion of said tube being positioned loosely within the passage with the adjoining end being located within the chamber, and means projecting laterally from the tube within the chamber preventing its withdrawal through the passage, said weight, at the exterior end of said passage, having a cross-sectional area approximating that of the tube, said weight having a generally conical shape with that portion at the exterior end of the passage constituting the apex, the cross-sectional area of the weight increasing gradually from the apex, the exterior surface of the weight constituting a substantially smooth gradually increasing continuation of the exterior surface of the tube.

3. The structure of claim 2 wherein said tube has a flow passage of approximately capillary size.

4. For use in a water distributing system, an elongated flexible water tube, and a tube weight for maintaining the discharge end of the tube in the vicinity of a plant while smoothly dispersing water flowing therefrom, said tube weight being generally conical in shape with an apex end having a cross-sectional area slightly greater than that of the tube, and an enlarged base end with a substantially greater cross-sectional area, a centrally located recess extending inwardly from the enlarged base end, means fixed to said base end and spanning the central portion of the recess, said means having the longitudinal edges thereof spaced from the sides of the recess so as to define openings, an elongated passage extending inwardly through the apex end into communication with the recess and in lateral alignment with the spanning means, said water tube extending through said passage and into the recess, the transition between the exterior surface of the tube and the exterior surface of the weight being smooth and gradual due to the small cross-sectional area of the weight at the apex end thereof.

5. The structure of claim 4 wherein said passage has a smooth bore and said tube is received loosely within said passage, and an enlargement on the inner end of said tube within the recess preventing withdrawal of the tube through the passage.

6. The structure of claim 5 wherein said means includes at least one tab secured to the base end adjacent the recess and bendable from a first postion projecting outwardly from the base end to a second position overlying the central portion of the recess.

7. The structure of claim 5 wherein said means includes a plurality of tabs secured to the base end adjacent the recess at peripherally spaced points thereabout, said tabs being bendable from a first position projecting outward from the base end to a second position overlying the recess and in free substantial abutment with each other.

8. The structure of claim 7 wherein said tube is of approximately capillary size.

9. The structure of claim 4 wherein said means includes a plurality of tabs secured to the base end adjacent the recess at peripherally spaced points thereabout, said tabs being bendable from a first position projecting outward from the base end to a second position overlying the recess and in free substantial abutment with each other.

10. The structure of claim 5 wherein said passage has a substantially constant diameter and extends through a major portion of the weight, thereby providing for a substantial progressive increase in weight inwardly from the apex end to the inner end of the recess.

References Cited by the Examiner

UNITED STATES PATENTS

| | | | |
|---|---|---|---|
| 1,484,575 | 2/24 | Shulin | 239—542 |
| 2,594,798 | 4/52 | Poe | 239—522 |
| 2,598,961 | 6/52 | Andrus. | |
| 2,833,281 | 5/58 | Krug | 128—221 |
| 2,876,496 | 3/59 | Murphy | 18—56 |
| 2,904,809 | 9/59 | Clayson | 239—547 |
| 3,035,779 | 5/62 | Convis | 239—208 |
| 3,036,783 | 5/62 | Hansen | 239—548 |
| 3,093,134 | 6/63 | Roehr | 128—221 |

FOREIGN PATENTS

| | | |
|---|---|---|
| 123,193 | 12/46 | Australia. |
| 1,051,083 | 2/59 | Germany. |

EVERETT W. KIRBY, *Primary Examiner.*